No. 752,582. PATENTED FEB. 16, 1904.
J. W. PACKARD & W. A. HATCHER.
BRAKING MECHANISM FOR MOTOR VEHICLES.
APPLICATION FILED MAR. 10, 1902.
NO MODEL. 2 SHEETS—SHEET 2.
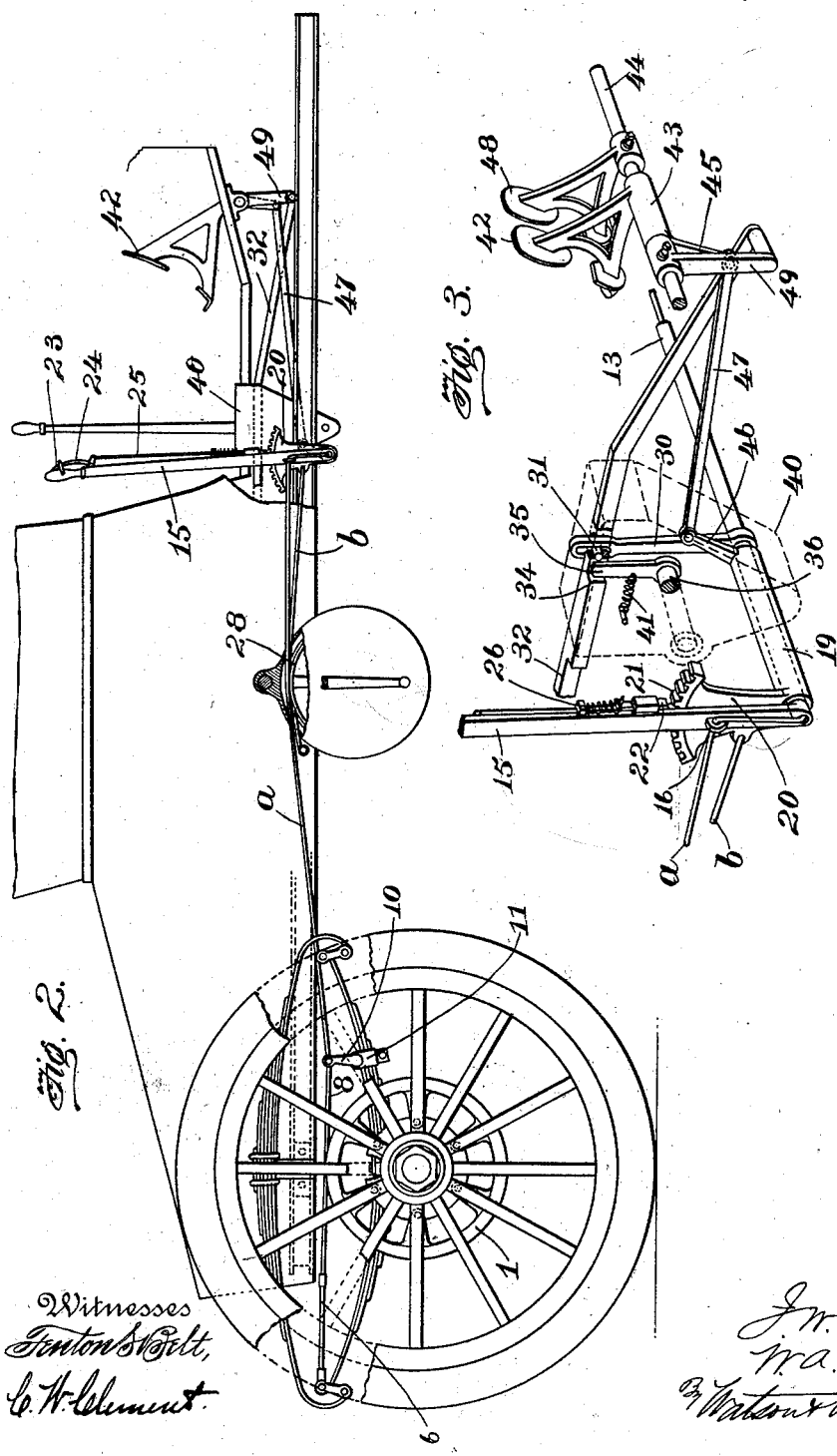

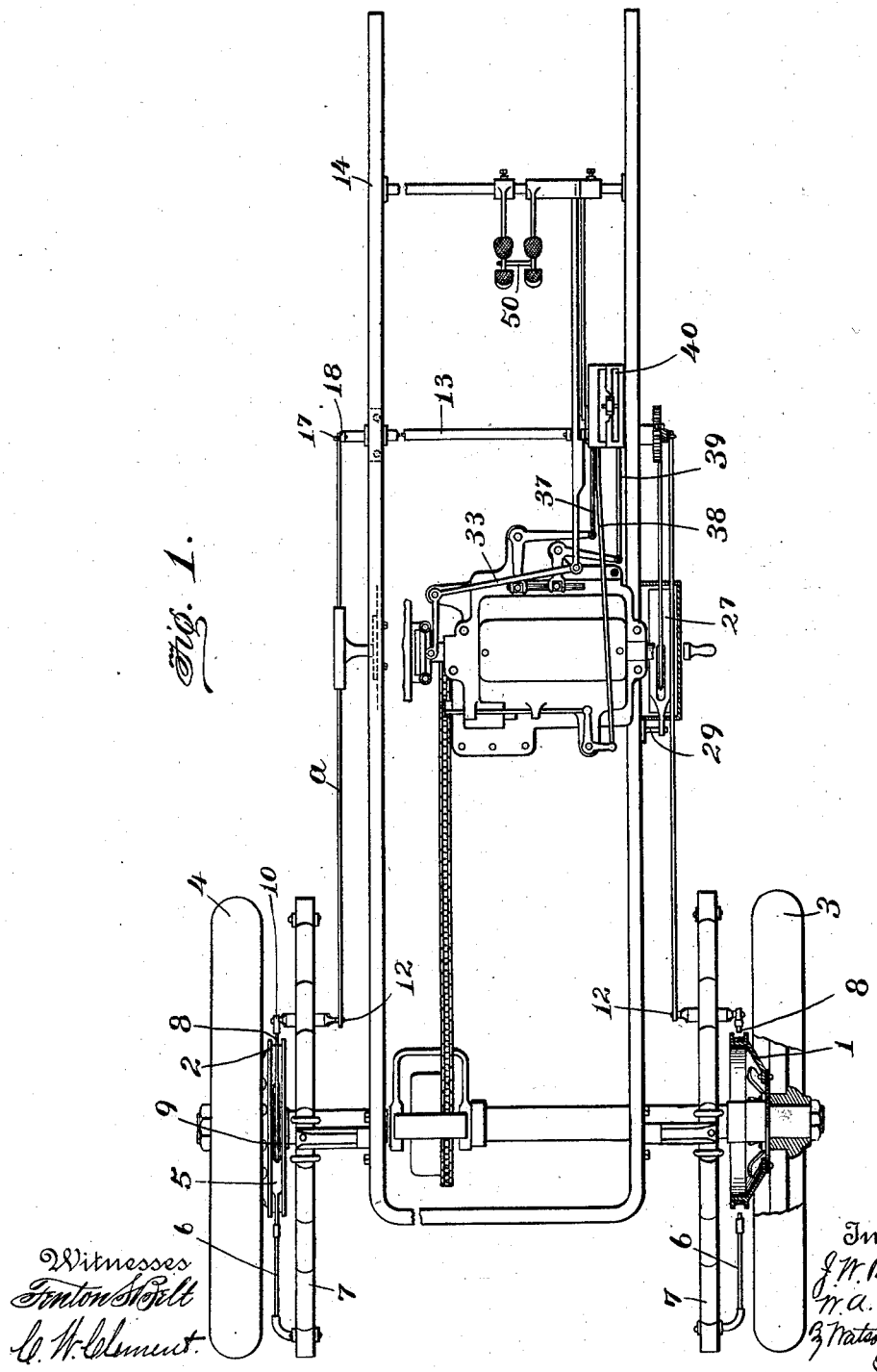

No. 752,582. Patented February 16, 1904.

UNITED STATES PATENT OFFICE.

JAMES W. PACKARD AND WILLIAM A. HATCHER, OF WARREN, OHIO, ASSIGNORS TO OHIO AUTOMOBILE COMPANY, OF WARREN, OHIO, A CORPORATION OF WEST VIRGINIA.

BRAKING MECHANISM FOR MOTOR-VEHICLES.

SPECIFICATION forming part of Letters Patent No. 752,582, dated February 16, 1904.

Application filed March 10, 1902. Serial No. 97,432. (No model.)

*To all whom it may concern:*

Be it known that we, JAMES W. PACKARD and WILLIAM A. HATCHER, citizens of the United States, residing at Warren, in the county of Trumbull, State of Ohio, have invented certain new and useful Improvements in Braking Mechanism for Motor-Vehicles, of which the following is a specification.

This invention comprises improvements in braking mechanism for motor-vehicles whereby brakes may be applied with equal force to a pair of wheels or driving-axles by means of equalizing connections between a brake-lever and the brakes, said lever being also adapted to operate a clutch for connecting the motive power with the driving-wheels; means for operatively connecting said lever with a brake upon the power mechanism whereby the wheel-brakes may be operated independently of or in conjunction with the power-brake, as desired; means for separately operating the power-brake without disturbing the wheel-brakes or clutch, and independent means for operating both of said brakes and the clutch.

The invention is applicable to vehicles operated by any suitable motive power; but some of these features are particularly applicable to vehicles driven by motors, such as explosive-engines, in which the motor runs constantly and the changes in speed are effected by means of changeable gearing and a clutch for connecting said gearing with the power-shaft. Means are therefore also provided for locking and unlocking the gear-shifting mechanism when the clutch is engaged and released, respectively.

In the accompanying drawings, Figure 1 is a plan view, partly broken away and partly in section, of the driving-wheels and part of the frame of a motor-vehicle with our improvements attached. Fig. 2 is a side elevation of a portion of the vehicle with said improvements thereon, and Fig. 3 is a perspective view of the operating-levers and their connections.

In carrying out the invention brake-wheels 1 and 2 are connected to the wheels 3 and 4, respectively, on opposite sides of the vehicle or to the driving-axles upon which said wheels are mounted. The brake-wheels are flanged on either side, as shown, and surrounding each wheel between the flanges is a brake-band 5, one end of which is secured by a rod 6 to the rear end of the adjacent vehicle-spring 7 or to any suitable fixed part of the vehicle. The free ends of the band-brakes are connected to short sections of cable 8, which extend through slots 9 in the brake-band and are connected to arms 10 upon short rock-shafts, which are journaled in bearings 11, suitably secured to the springs, said rock-shafts having arms 12 at their inner ends, to which the ends of a cable *a* are secured. The cable *a* extends through a tubular rock-shaft 13, which is arranged in suitable bearings transversely of the vehicle-frame 14, the ends of said shaft extending laterally outward from the sides of the frame, as shown, so that the pull of the cable upon the arms 12 will be direct. The rope or cable *a* and the sections 8 are connected together through the rocker-arms 10 and 12 in order to bring the cable close to the frame and yet give a direct pull upon the brake. This is merely a matter of mechanical convenience and the sections 8 are for all practical purposes a continuation of the cable *a*.

A hand brake-lever 15 is secured to the tubular shaft 13, and upon the side of said lever a short distance above the shaft is arranged an eye 16, through which the cable passes. The cable also passes through an eye 17 upon an upright arm 18 at the opposite end of the tubular shaft. It will be seen that when the lever 15 is rocked forward the cable will be tightened and the brakes applied by reason of the movement of the eyes 16 and 17, through which the cable passes and by which the slack in the cable and brake-bands is taken up. As the cable is not secured at any point between its ends, it is free to slide through the eyes and adjust itself so that the pull upon each end of the cable will be the same, and the brakes will therefore be applied with equal power.

A sleeve 19 is journaled upon the tubular shaft 13 and carries at one end an arm 20, upon the upper end of which is a segmental rack 21, which rack is adapted to be engaged by a pawl 22, mounted upon the lever 15, said pawl being normally held out of engagement by a suitable locking device, such as the ring 23, which slips over the handle 24, which handle is pivoted to the rod 25, to which the pawl is attached. A spring 26 is arranged upon said rod, so that when the ring 23 is raised and the handle 24 released the spring will throw the pawl into engagement with the rack 21. A cable $b$ connects the lever-arm 20 with the free end of a brake-band 27, which brake-band is the same in construction as the bands 5. The brake-band 27 extends around a brake-wheel 28, which is mounted upon a shaft connected with the driving power, and the opposite end of the brake-band is secured to a pin 29 or other suitable fixture.

It will be seen that while the pawl 22 is held out of engagement with the rack 21 the operation of the hand-lever 15 will apply and release the wheel-brakes only, while in case of emergency the hand-lever and the lever-arm 20 may be operated together to apply both the wheel-brakes and the brake upon the driving-power by moving the ring 23 out of engagement with the handle 24, thereby permitting the pawl to drop into the rack 21.

A link 30 is secured to the shaft 13, and said link engages a pin 31 upon a rod 32, which is connected to a clutch-lever 33, the arrangement being such that when the hand-lever 15 is thrown forward the rod 32 will be moved to release the clutch, after which a continued forward movement of the hand-lever causes the brakes to be applied. The rod 32 is formed with a shoulder 34, which when said rod is moved forward engages an arm 35 upon a cam-shaft 36. This cam-shaft is arranged to lock and unlock the gear-shifting links 37, 38, and 39, which extend into a controlling-box 40. (Shown in dotted lines in Fig. 3.) The gear-shifting device, the controlling-box, and locking-cam are fully illustrated and described in our copending application, Serial No. 96,829, filed March 5, 1902, and need not be herein described. When the arm 35 is moved forward, the gear-shifting devices are released, so that the gears may be shifted while the clutch is out of engagement, and when the rod 32 is moved backward by the operation of the hand-lever to engage the clutch a spring 41 returns the arm 35 and cam-shaft 36 to their normal positions.

In order to provide means for applying the brake-band to the power-shaft for the purpose of temporarily slowing down the vehicle without throwing the clutch out of engagement, a foot-lever 42 is provided, which lever is secured to a sleeve 43 upon a shaft 44, extending transversely of the vehicle-frame, and said sleeve is provided with an arm 45, which is connected to an arm 46 upon the sleeve 19 by a link 47. It will be evident that the depression of the foot-lever 42 will draw the link 47 forward, thereby rocking the lever-arm 20 and causing the brake 27 to be applied to the brake-wheel 28 upon the power-shaft, and the return of the foot-lever to its normal position will release said brake. By these means the vehicle can be slowed down temporarily without moving the clutch-operating mechanism. Provision is also made for applying by foot-power both the wheel-brakes and the brake upon the power-shaft and simultaneously disengaging the clutch. This is accomplished by means of a foot-lever 48, which is rigidly secured to the shaft 44 and adapted to rock said shaft. An arm 49, also secured to the shaft 44, is connected to one end of the rod 32, which operates the clutch, so that when the foot-lever or treadle 48 is depressed the rod 32 is moved forward and the clutch thereby disengaged. At the same time the link 30, which is rigidly secured to the tubular rock-shaft 13, is moved forward by the rod 32, thereby rocking the shaft 13 and causing the wheel-brakes to be applied. A bar or projection 50, connected with the treadle 42, extends beneath the treadle 48, so that the depression of the treadle 48 carries with it the treadle 42 and causes the brake upon the power-shaft to be applied throughout the medium of the parts hereinbefore described connected with said lever 42.

From the above description it will be understood that by means of the hand-lever the clutch may be operated without applying the brakes and that the wheel-brakes alone may be applied or in conjuction with the brake upon the power-shaft, and the force with which the power-shaft brake is applied depends upon the point at which the pawl engages the rack. It will also be understood that by operating the treadle 42 the power-brake alone will be applied without affecting the clutch or wheel-brakes and that by the operation of the treadle 48 all of the brakes and the clutch may be operated. The cable $a$ being in sliding engagement with the levers serves as an equalizing device for applying the brakes equally to each wheel, thereby preventing strain upon the driving-shaft and differential gearing and also preventing tendency of the wheels to turn out of their course, which tendency occurs where the pressure is applied heavily on one side of the vehicle and lightly on the other.

Having thus described our invention, what we claim, and desire to secure by Letters Patent, is—

1. In a motor-vehicle, the combination with a pair of vehicle-wheels upon opposite sides of the vehicle, and a separate braking device for each wheel, of a rope or cable having its ends connected to said braking devices and extending forwardly therefrom at the sides of the vehicle, bearings upon opposite sides of the vehicle through which said cable extends, and a lever having a part in sliding engagement with and adapted to tighten the cable.

2. In a motor-vehicle, the combination with a pair of vehicle-wheels upon opposite sides of the vehicle and separate braking devices for each wheel, of a rope or cable having its ends connected to said braking devices, a transverse shaft, arms thereon to which the rope or cable is connected, and bearings for said shaft upon opposite sides of the vehicle, said cable extending through said bearings.

3. In a motor-vehicle, the combination with a pair of vehicle-wheels upon opposite sides of the vehicle and separate braking devices for each wheel, of a rope or cable having its ends connected to said braking devices, a tubular shaft extending transversely of the vehicle and through which the cable extends, and a lever upon said shaft having a part in sliding engagement with the cable.

4. In a motor-vehicle, the combination with a pair of vehicle-wheels upon opposite sides of the vehicle, and a separate braking device for each wheel, of a tubular shaft extending transversely of the vehicle, an arm at one end of said shaft and a lever at the opposite end, said arm and lever each having an eye, and a rope or cable extending through said shaft and through said eyes, and having its ends connected to the braking devices.

5. In a motor-vehicle, the combination with a wheel-brake and a brake for the driving mechanism, of separate operating devices for each of said brakes, and means for detachably connecting said operating devices for the purpose of applying both brakes.

6. In a motor-vehicle, the combination with a wheel-brake and a brake for the driving mechanism, of levers separately connected to each brake, one of said levers having a pawl thereon and the other having a rack adapted to be engaged by said pawl.

7. In a motor-vehicle, the combination with a wheel-brake and a brake for the driving mechanism, of levers separately connected to each brake, one of said levers having a pawl thereon and the other having a rack adapted to be engaged by said pawl, and means for normally holding said pawl out of engagement with the rack.

8. In a motor-vehicle, the combination with a wheel-brake and a brake upon the driving mechanism, of separate operating-levers and connections for each brake, clutch-operating mechanism connected with one of said levers, and means for detachably connecting both of said brake-levers.

9. In a motor-vehicle, the combination with a wheel-brake, a brake upon the driving mechanism and levers arranged to operate the brakes separately, of an independent lever and connections arranged to operate both of said brakes.

10. In a motor-vehicle, the combination of a wheel-brake, a clutch, a brake upon the driving mechanism, a lever arranged to operate the wheel-brake and clutch, a lever arranged to operate the brake upon the driving mechanism and an independent lever arranged to operate both brakes and the clutch.

11. In a motor-vehicle, the combination of a wheel-brake, a clutch for connecting the power to the driving-wheels, a hand-lever for operating said clutch and brake, a brake upon the driving mechanism, a treadle for operating said latter brake independently, and means for detachably connecting the hand-lever with the mechanism for operating the brake upon the driving mechanism.

12. In a motor-vehicle, the combination of a wheel-brake, a clutch for connecting the power to the driving-wheels, a hand-lever for operating said clutch and brake, a brake upon the driving mechanism a treadle for operating said latter brake independently, means for detachably connecting the hand-lever with the mechanism for operating the brake upon the driving mechanism, and a separate treadle and connections thereto for operating both brakes and the clutch.

13. In a motor-vehicle, the combination of a wheel-brake, a clutch for connecting the power to the driving-wheels, a hand-lever for operating said clutch and brake, a brake upon the driving mechanism, a treadle for operating said latter brake independently, and a separate treadle and connections thereto for operating both brakes and the clutch.

In testimony whereof we affix our signatures in presence of two witnesses.

JAMES W. PACKARD.
WM. A. HATCHER.

Witnesses:
E. L. WARNER,
C. H. DUNLAP.